United States Patent [19]

Shepard et al.

[11] Patent Number: 5,166,002
[45] Date of Patent: Nov. 24, 1992

[54] HIGH-TEMPERATURE, HIGH-EMISSIVITY, OPTICALLY BLACK BORON SURFACE

[75] Inventors: Donald F. Shepard, Evergreen; Robert J. Fenolia, Broomfield, both of Colo.; Dennis C. Nagle, Ellicott City; Michael E. Marousek, Baltimore, both of Md.

[73] Assignee: Martin Marietta Corporation, Denver, Colo.

[21] Appl. No.: 699,884

[22] Filed: Jun. 27, 1991

Related U.S. Application Data

[62] Division of Ser. No. 280,146, Dec. 5, 1988, Pat. No. 5,035,949, said Ser. No. 704,129.

[51] Int. Cl.$^5$ ............................................. B32B 15/04
[52] U.S. Cl. .................................... 428/457; 428/689; 428/704; 427/162; 427/376.1; 427/419.3; 427/446; 427/453
[58] Field of Search ................. 427/423, 34, 162, 228, 427/376.1, 419.3; 428/457, 689, 704

[56] References Cited

U.S. PATENT DOCUMENTS

| | | | |
|---|---|---|---|
| 3,231,416 | 1/1966 | Fuller | 427/34 |
| 3,231,417 | 1/1966 | Fuller | 427/423 |
| 4,342,734 | 8/1982 | Kumar et al. | 427/34 |
| 5,035,949 | 7/1991 | Shepard et al. | 427/34 |

Primary Examiner—Michael Lusignan
Assistant Examiner—Diana L. Dudash
Attorney, Agent, or Firm—Tarolli, Sundheim & Covell

[57] ABSTRACT

An article of manufacture comprises a substrate and an optically black surface on the substrate and having an absorptivity of more than about 0.89 and an emissivity more than about 0.86. The surface comprises boron particles plasma spray applied to the substrate using a powder selected from the group consisting of crystalline boron having a particle size finer than about 200 mesh and amorphous boron.

11 Claims, 2 Drawing Sheets

100μ

HIGH-TEMPERATURE, HIGH-EMISSIVITY, OPTICALLY BLACK BORON SURFACE

This invention was made with Government support under Contract F33615-81-C-5117 awarded by the Department of the Air Force. The government has certain rights in this invention.

This is a divisional of co-pending Application Ser. No. 07/280,146, filed on Dec. 5, 1988, now U.S. Pat. No. 5,035,949, issued Jul. 30, 1991, and application Ser. No. 07/704,129, filed May 22, 1991.

The present invention relates to optically black boron surface which are applied by plasma-jet spray onto a substrate. For purposes of the present application, the term "optically black" means capable of energy absorption in both the visible (solar) region and the infrared region. In such spectral regions, the surfaces of the present invention have both a high absorptivity of solar radiation and a high emissivity in the infrared region. The surfaces of the present invention also have a high thermal stability, are suitable for use in nuclear environments, and are substantially inert to many chemical and oxidizing environments.

BACKGROUND OF THE PRESENT INVENTION

Prior U.S. Pat. No. 4,342,734, issued Aug. 3, 1982 to Dumar and Das, discloses the preparation of thick, dense wafers of crystalline gamma-tetragonal boron by plasma-jet applying beta-rhombohedral boron in powder form onto a substrate and rapidly cooling the molten particles. The beta-boron powder had a particle size of $-100$ mesh. The patent makes no mention of the optical properties of the cooled deposit nor reference to the formation of optically black surfaces. The patent is also silent on other properties such as resistance to high temperature degradation or corrosion resistance to chemical or oxidizing environments.

Prior U.S. Pat. No. 3,231,416, issued Jan. 25, 1966, to Fuller, discloses the preparation of zirconia-boron ablation coatings by plasma-jet spraying. An example of a powder used in the '416 patent contained 60 volume percent zirconia (325 mesh) and 40 volume percent boron (100 mesh). The coatings were said to be capable of withstanding temperatures of about 2280° C. during a ten second test period. This, in part, was attributed to good thermal emittance or ability to radiate heat away from the coated body. As in the '734 patent, no reference is made to the infrared or visible wavelength absorption or other properties which characterize the present invention.

Also of interest are prior U.S. Pat. Nos. 4,503,085, dated Mar. 5, 1985, issued to Dickson et al.; 4,526,618, issued Jul. 2, 1985, to Keshavan et al.; and 4,696,855, dated Sep. 29, 1987, issued to Pettit, Jr., et al.

BRIEF SUMMARY OF THE INVENTION

The present invention resides broadly in an article or manufacture comprising a substrate and an optically black surface on said substrate having an absorptivity of more than about 0.89 and an emissivity more than about 0.86, said surface comprising boron particles plasma spray applied to said substrate using a boron powder selected from the group consisting of crystalline boron having a particle size finer than about 200 mesh and amorphous boron.

Preferably, the crystalline boron has a powder size finer than about 325 mesh.

It is also preferable that the boron powder have a purity of at least about 95%.

Applications for the articles of manufacture of the present invention include sunshades, surfaces exposed to high temperature environments such as laser beams, thermal control surfaces such as high temperature radiators for nuclear reactors or neutron absorbers, and surfaces exposed to corrosive chemicals or oxidative agents such as linings for chemical tanks, flow lines and nitrogen tetroxide containing propellant tanks. By the term "sunshade", it is meant any baffle or surface positioned for the control of light in such applications as telescopes, laser beam control, energy absorbers or radiators, and spacecraft optical systems.

Preferred substrated in accordance with the present invention are titanium, nickel, molybdenum, and alloys thereof.

BRIEF DESCRIPTION OF THE DRAWINGS

The invention and advantages thereof will become more apparent upon consideration of the following specification, with reference to the accompanying drawings, in which.

DETAILED DESCRIPTION OF THE INVENTION AND BEST MODE

Figure 2:
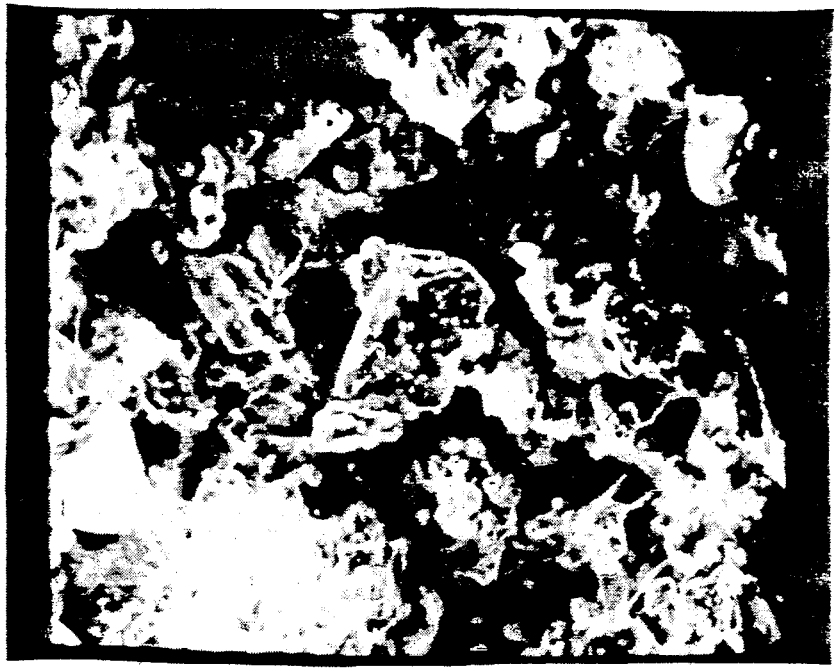
FIG. 2 is photograph of a portion of the surface of FIG. 1 taken at 1,000 X magnification using an electron microscope.

The plasma spray process is well known and fully described in numerous prior patents, including, by way of example, prior U.S. Pat. No. 4,526,618 referred to above. The disclosure of the '618 patent in this respect is incorporated by reference herein.

In the plasma spray process, a gas is used as a heating and carrier medium. A preferred gas is an inert gas such as argon. A stream of the gas is heated to a high temperature by being passed between electric arc-forming electrodes. The plasma expands due to its high heat and kinetic energy and produces a high velocity directional jet. Boron particles are injected into the rapidly flowing heated stream wherein they are heated to a sufficiently high temperature to become melted or softened. The plasma jet is directed at a target surface, depositing the molten or softened boron particles onto the surface. The boron particles are allowed to cool by exposure to ambient conditions, aided by the application of cooling water to the backside of the substrate. This allows the boron particles to become bonded to the surface and to each other in the formation of a thin layer.

For purposes of the present application, the term "plasma spray process" includes derivatives of the process capable of heating the boron particles to a high enough temperature to soften or melt the particles, such as detonation gun spraying.

Practically any substrate, including most metals, and even plastics, which are capable of withstanding the high temperature gas stream, and adapted to receive the molten or softened metal particles, can be employed. Boron has a coefficient of thermal expansion of about $4.6 \times 10^{-6}$ in./in./°F., and titanium has a coefficient of expansion very close to that, about $4.7 \times 10^{-6}$ in./in./°F., making titanium or a titanium alloy a preferred substrate. However, the present invention has been successfully practiced with other substrate surfaces, such as molybdenum and nickel.

It is well known that certain substrates such as molybdenum, tantalum, niobium, tungsten and copper are difficult to coat by plasma spray and obtain a good bond. To further compound the problem, aeronautical and space uses for the present invention require that the substrates by relatively thin (e.g., less than 0.030 inches) and thus lightweight. This thinness of the substrates makes it impractical to subject them to severe surface preparation such as abrasion and or substrate heating. In an aspect of the present invention, ti was found that these disadvantages could be overcome by applying, by plasma spray, a molybdenum titanium self-bonding coat, preferably a mixture of 80% molybdenum/20% titanium, to which a boron top coat would adhere.

The bond coat could be applied without heating the substrate, adhered well to such substrates as molybdenum and provided an excellent surface for application of a top coat such as boron.

The boron powder employed in the practice of the present invention can be either a crystalline boron or amorphous boron. Both have been successfully plasma sprayed onto a substrate. Preferably, the boron has a purity of at least about 90%, more preferably, at least about 95%. The boron has to be in fine powder form, for instance, that of amorphous boron which typically has an average particle size less than about 10 microns. In the case of the crystalline boron, this should have an average particle size finer than about 200 mesh, preferably an average particle size finer than about 325 mesh.

The fine particle sized boron tended to be hygroscopic and tended to pack. This problem was overcome by either forming the boron into aggregates using an organic binder and mechanically grinding and sieving the aggregates to a flowable particle size such as −325 mesh, or by adding a small amount of a flow enhancer such as a ceramic oxide to the boron powder to increase its flowability. One suitable binder employed was polyvinyl alcohol, added as a 2% by weight aqueous solution to the powder, which was then dried and subjected to grinding and sieving to −325 mesh. The amount of binder used was about five weight percent based on the weight of the boron. Numerous fine particle size ceramic oxide powders are commercially available. One that was successfully employed was a silica ceramic in the form of microspheres marketed by 3M under the trademark "Glass Bubbles A38/4000". The amount used was about 10-70 weight percent, based on the weight of the entire composition. These "Glass Bubbles" had a particle size such that a maximum of 5% by weight was retained on a U.S. No. 80 standard sieve. Yttria stabilized zirconium oxide in the amount up to about 70 volume percent (basis entire composition) has also been successfully employed as a ceramic oxide flow enhancing agent. An example of another ceramic oxide is aluminum oxide.

The boron surfaces which are applied to a substrate by the plasma jet process have an irregular surface morphology of peaks and valleys which gives, without further treatment, good absorptivity and emissivity making such surfaces useful as optical baffles. However, it was found that the absorptivity and emissivity could be further increased by subjecting the surfaces to calcination. This was carried out at an elevated temperature, for instance about 400° C. to about 600° C. for 30 to 60 minutes in an air atmosphere. By calcination, the absorptivity can be increased up to about 0.95, and the emissivity similarly may be increased, for instance up to about 0.93.

The coating depths were determined to be about 200±15 microns.

The following examples illustrate the practice of the present invention. In these examples, absorptivity and emissivity were measured using a Gier-Dunkle MF-251 solar reflectrometer and a Gier-Dunkle DB-100 infrared reflectometer.

EXAMPLE 1

This Example illustrates the preparation of an optically black sunshade by application of crystalline boron to a substrate. The substrate selected in this Example was a titanium, aluminum, vanadium alloy having six parts aluminum and four parts vanadium to 100 parts titanium (Ti-6Al-4V).

The surface of the substrate was prepared by degreasing it with 1,1,1-trichloroethane. Application of the boron was carried out using a plasma spray gun manufactured by the Metco Division of Perkin-Elmer, Westbury, New York, Model No. 7M.

The boron was crystalline boron marketed by Consolidated Astronautics identified as having a purity of 96.6% and a particle size of −325 mesh. Analysis of the powder revealed that it had an average particle size of about 20 microns with 90% of the particles being less than about 90 microns. To improve the flowability of the boron powder into the plasma spray gun, the powder was formed into small aggregates by mixing the pwoder with 1-2% by weight (based on the weight of boron) of a 2% by weight solution of polyvinyl alcohol, which mixture was then dried. The dried aggregates were mechanically ground and sieved to −325 mesh (U.S. Sieve).

The spray settings on the plasma spray gun were:

| Parameter | Primary Gas Argon | Secondary Gas Hydrogen |
|---|---|---|
| Pressure | 100 psi | 50 psi |
| Flow | 80 (setting) | 15-20 (setting) |
| Nozzle | — | Gh |
| Current | — | 500 Amps |
| Voltage | — | 65 V |
| Power | — | 32.5 KW |
| Powder Feeder-4MP-dual | | |
| Powder Port | No. 2 at about 90 | |
| Powder port shaft | A | |
| Carrier gas flow | 37 | |
| Air vibrator | 15-20 psi | |
| Powder feed rate indicator | 80 (setting) | |

The spraying was carried out using a gun-to-work distance of about 10-15 centimeters. A thin film was desired, just covering the substrate, so that the application was by hand making four fast passes with the gun. The coated substrate was cooled by application of water to the backside of the substrate. The absorptivity of the boron surface was about 0.93 and the emissivity was about 0.87. The coating had a dark grey appearance and was considered to be suitable, without further treatment, for use as an optically black sunshade.

It was found that the optical properties of the surface could be somewhat further increased by exposure of the boron surface to calcination. In this Example, calcination was carried out at 500° C. to 600° C. for about two hours, in air, and resulted in an increase in absorptivity to about 0.95 (about a 30% increase), but no increase in emissivity. Following calcination, the coating had a black appearance.

EXAMPLE 2

This Example illustrates the preparation of an optically black sunshade using an amorphous boron. The boron was marketed by Consolidated Astronautics and was identified as having a purity of about 96% and an average particle size of about five microns. The average particle size was determined to be slightly less than five microns.

To increase the flowability of the amorphous boron, the boron was mixed with 32% by weight, based on the weight of the total composition, of fine particle size glass ceramic microspheres marketed by 3M under the trade designation "Glass Bubbles A38/4000". The microspheres had a particle size such that a maximum of 5% by weight was retained on a U.S. No. 80 standard sieve.

The spray conditions and equipment used were the same as in Example 1 except that the gun to work distance employed was about 5–10 centimeters. Also the substrate employed was nickel (Ni-201) instead of the titanium alloy of Example 1, and the substrate was prepared, prior to plasma spraying the amorphous boron, by application of a standard nickel bond coat consisting of a nickel, chromium, aluminum alloy marketed by Metco under the trade designation "Metco 443". The bond coat was plasma spray applied to the Nickel substrate using essentially the same spray conditions as in Example 1, giving a thin layer of about 0.002–0.005 inches.

Following spraying, the samples were subjected to calcination under an air atmosphere for about two hours at 600° C. Calcination gave a surface having a visually black appearance and increased the absorptivity from about 0.90 to about 0.93. The emissivity following calcination was about 0.90. The surface had a visually black appearance.

Samples of optically black baffles prepared in accordance with this Example were subjected to a continuous wave laser test at 10.6 microns. There was no damage to the boron surface that could be determined by visual inspection. Absorptivity decreased slightly from about 0.93 to about 0.92. Emissivity decreased slightly from about 0.90 to about 0.89.

EXAMPLE 3

Similar samples as in Example 2 were prepared using molybdenum as the substrate.

It is well known that materials such as molybdenum, tantalum, niobium, tungsten and copper are difficult materials on which to deposit self-bonding surface coatings by plasma spray. In the present instance, the uses of principle intersect are space or aeronautical associated, where light weight is desired. Accordingly the substrate in this example had a thickness of only about 0.015 inches. This prevented the surface from being intensively prepared, for instance by surface roughening, or heated to an elevated temperature prior to applying a plasma sprayed boron coat.

It was found that these difficulties could be overcome by applying a molybdenum/titanium bond coat to the substrate prior to application of the boron top coat. Only through cleaning of the substrate was required, and no mechanical roughening of the surface such as by rough grit blasting was necessary. The bond coat adhered well and provided a surface roughness ideally suited for the reception of sprayed top coats.

In this example, the bond coat was an 80/20 blend of molybdenum and titanium. The substrate was cleaned using 1,1,1-trichloroethane and a light sand blast. The conditions of application and spray gun were:

| Spray Gun | |
| --- | --- |
| Type - 7MB (Metco) | |
| Nozzle - GH | |
| Uni-jet Ring | |
| Argon Insulator | |
| #2 Powder Port at 90 | |
| Gas Pressure | Gas Flow |
| Primary (argon) - 100 psi | Primary (argon) - 80 psi |
| Secondary (hydrogen) - 5 psi | Secondary (hydrogen) - 15 psi |
| Power | Powder Feed |
| Unit Model - 7MR (Metco) | Unit - 4MP Dual |
| Arc Amps - 500 | Powder Port Shaft - A |
| Arc Volts - 60–65 | Carrier Gas Pressure - 100 psi |
| | Flow Meter Reading - 47 psi |
| | Feed Rate Indicator - 100–125 |
| | Air Vibrator Pressure - 20–25 psi |

The thickness of the bond coat was about 0.002–0.005 inches.

It should be noted that this bond coat can be successfully applied to almost any metal, and was successfully applied to such substrates as nickel, titanium and the titanium-aluminum vanadium alloy of Example 1, in addition to molybdenum, giving in each instance excellent bond strength and the advantages noted above with regard to application to a molybdenum substrate.

In this Example, the same spray conditions and amorphous boron as employed in Example 2 were used. The amorphous boron surface when plasma sprayed onto the bond coat gave an absorptivity of about 0.97 and emissivity of about 0.88. These samples also were deemed to be within the scope of the present invention. No posttreatment such as calcination was used.

These samples were exposed to the same continuous wave laser test as in Example 2, and the samples also passed visual examination. The absorptivity was found to decrease slightly to about 0.93, whereas the emissivity remained generally constant.

Figure 3:
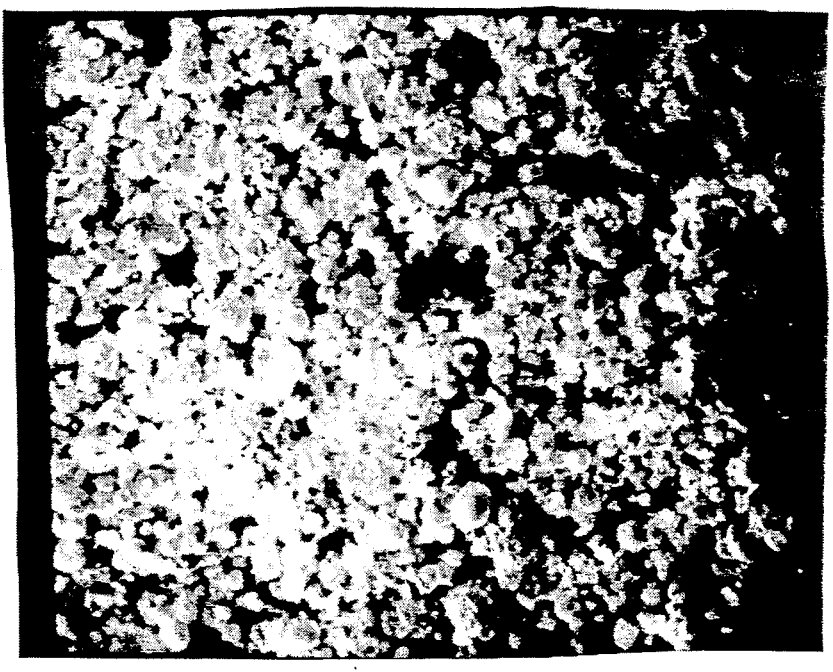
FIG. 3 is a surface view of an optically black boron surface prepared by plasma spray application of amorphous boron onto a substrate. The photograph of FIG. 3 was taken at 250 magnification using an electron microscope.

The sample of Example 3 was the subject of the photograph of FIG. 3, taken at 100X magnification. As shown in this Figure, the boron particles formed, on impact, a rough, nodular, layered surface with deep indentations capable of trapping light.

EXAMPLE 4

In this Example, the same crystalline boron as in Example 1 was plasma spray applied to a nickel (Ni-201) substrate (precoated with a nickel, chromium, aluminum alloy bond coat, Metco 443, as in Example 2), subsequently calcined, and then exposed to the same continuous wave laser test as in Examples 2 and 3. To increase the flowability of the crystalline boron, the boron was mixed with 32% by weight of glass ceramic microspheres as in Example 2. The procedures of plasma spray application and calcination were the same as in Example 1. Following plasma spray application and following calcination, the solar absorptivity was determined to be about 0.92 and about 0.97, respectively. The emissivity after plasma spray application and after calcination remained constant at about 0.88. Following the continuous wave laser test, absorptivity dropped slightly to about 0.93 and emissivity decreased slightly to about 0.87. These samples were deemed also to be within the scope of the present invention, and were deemed to have passed the laser test, both with regard to measured absorptivity and emissivity, and by visual examination.

Figure 1:
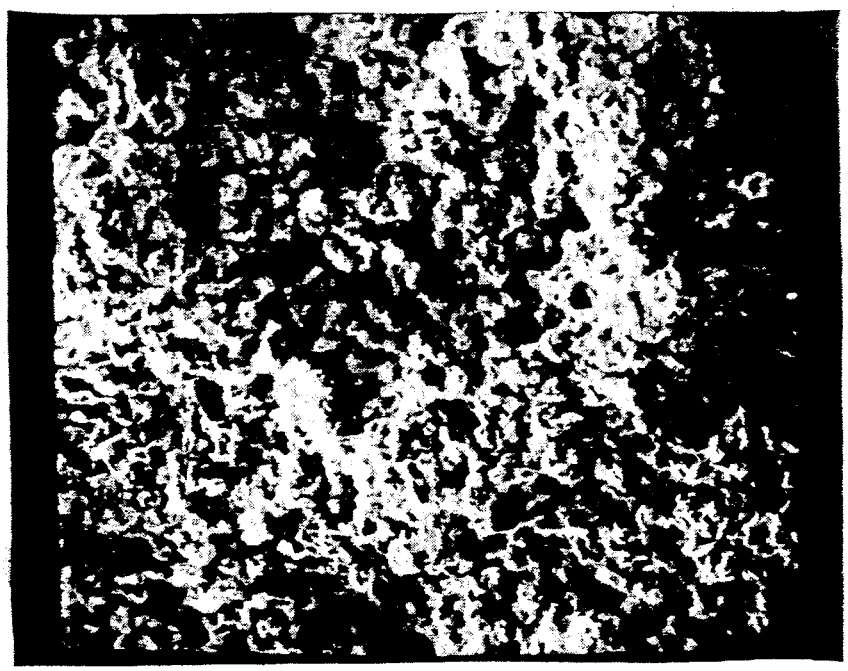
FIG. 1 is a surface view of an optically black boron surface prepared by plasma spray application of a crystalline boron powder onto a substrate. The photograph of FIG. 1 was taken at 250 K magnification using an electron microscope.

The physical characteristics of the surfaces of this Example are shown in FIGS. 1 and 2, taken at 250X and 1,000X magnification, respectively. As shown in these Figures, the boron particles formed on impact, a rough, platelet layered surface with deep indentations capable of trapping light.

In the surfaces of both Examples 3 and 4, the nodules or platelets provided a large number of points of absorption separated from each other by a spectrum of distances roughly equivalent to or slightly more than the spectrum of visual and infrared light. Although not to be held to any particular theory, it is believed that the high absorptivity and emissivity values obtained in the practice of the present invention are due to this, plus the blackness of the relatively pure boron particles.

EXAMPLES 5-10

These Examples illustrate that the surfaces of the present invention have a resistance to attack from common corrosive or oxidative agents such as acids and solvents.

The samples were prepared following the procedure of Example 1 except that there was no calcination post-treatment following plasma spray application to a substrate. The substrate in these Examples was the titanium, aluminum, vanadium alloy of Example 1. The boron form employed wa the same crystalline boron as in Example 1.

Exposure to the corrosive agents was carried out employing conventional etching procedures; namely, maintaining the agents at room temperature or an elevated temperature as indicated in the following table, and then holding the samples immersed in the solutions for a sufficient period of time to cause etching if etching was to occur, for instance as evidenced by the evolution of hydrogen. In all instances, there was no evidence of etching.

TABLE 1

| Samples | Treatment | Optical Properties | | Effect on Optical Properties |
|---|---|---|---|---|
| | | Absorptivity | Emissivity | |
| Example 5 | Exposure to a methanol/ sulfuric acid mixture | — | — | None |
| Example 6 | Exposure to an ethanol/ potassium hydroxide mixture | 0.90 | 0.87 | None |
| Example 7 | Exposure to a sulfuric acid/ chromic oxide solution | — | — | None |
| Example 8 | Exposure to boiling sulfuric acid | 0.91 | 0.89 | None |

TABLE 1-continued

| Samples | Treatment | Optical Properties | | Effect on Optical Properties |
|---|---|---|---|---|
| | | Absorptivity | Emissivity | |
| Example 9 | Exposure to boiling nitric acid | | | None |
| Example 10 | Exposure to nitric acid/ sodium chromate solution | 0.89 | 0.86 | None |

Similar samples subjected to conventional anodization also showed a resistance or inertness to chemical reactivity under these conditions.

The low chemical reactivity characteristics of the surfaces of the present invention permits them to be exploited in many corrosive chemical container and flow line applications, as well as for equipment which must be operated in a corrosive or oxidative environment.

EXAMPLE 11

The purpose of this Example is to show that the boron surfaces of the present invention are stable to prolonged exposure at high temperatures. In this Example, crystalline boron was plasma spray applied to the titanium alloy substrate of Example 1, except that the substrate was first bond coated with a nickel chromium, aluminum alloy (Metco 443) as in Example 2. The boron powder was blended with 32% by weight glass ceramic microspheres as in Example 2 to increase flowability. The same conditions of application, procedures, boron powder, and spray gun as in Example 1 were used. The boron surface, following application, had an absorptivity of about 0.91 and an emissivity of about 0.88.

The surface was subjected to calcination at 900° C. for ½ hour. Absorptivity actually increased slightly to about 0.92, and emissivity remained constant at about 0.88. The surface remained visually black.

Having described a preferred embodiment of the invention, I claim:

1. A method for the preparation of an optically black article of manufacture comprising the steps of:
    plasma spray applying onto a substrate a boron powder of at least about 90% purity selected from the group consisting of crystalline boron having a particle size of about −200 mesh and amorphous boron,
    said plasma spraying being under conditions effective to obtain a boron coating bonded to said substrate having an irregular surface morphology of peaks and valleys,
    said coating having an absorptivity of more than about 0.89 and an emissivity of more than about 0.86.

2. The method of claim 1 wherein said substrate is selected from the group consisting of titanium, nickel, molybdenum and alloys thereof.

3. The method of claim 1 wherein said boron powder is −325 mesh and blended with ceramic oxide microspheres.

4. An optically black sunshade prepared by the method of claim 1.

5. A method for the preparation of an optically black article of manufacture comprising the steps of:

plasma spray applying onto a substrate a boron powder of at least about 90% purity selected from the group consisting of crystalline boron having a particle size of about −200 mesh and amorphous boron, calcining the plasma-spray-applied boron surface, said surface having an absorptivity of more than about 0.89 and an emissivity of more than about 0.86.

6. A method for plasma spraying boron onto a substrate selected from the group consisting of molybdenum, tantalum, niobium, tungsten, and copper for the preparation of an optically black article of manufacture, comprising the steps of:

providing said substrate;

plasma spray applying a bond coat which is a mixture of molybdenum and titanium onto said substrate;

plasma spray applying onto said bond coat a boron powder of at least about 90% purity selected from the group consisting of crystalline boron having a particle size of about −200 mesh and amorphous boron;

said plasma spraying of said boron powder being under conditions effective to obtain a boron coating having an irregular surface morphology of peaks and valleys;

said article having an absorptivity of more than about 0.89 and an emissivity of more than about 0.86.

7. The method of claim 6 wherein said substrate has a thickness less than about 0.030 inches.

8. The method of claim 7 wherein said bond coat is applied without externally applied substrated heating.

9. The method of claim 6 wherein said bond coat is an 80/20 blend, on a weight basis, of molybdenum and titanium.

10. The method of claim 6 further including the step of calcining the plasma-spray-applied boron surface.

11. The method of claim 6 wherein said boron powder is −325 mesh and blended with ceramic oxide microspheres.

* * * * *